US 12,290,844 B2

(12) United States Patent
Friemann Dmitriev et al.

(10) Patent No.: US 12,290,844 B2
(45) Date of Patent: May 6, 2025

(54) METHOD FOR SORTING OF ITEMS AND AN ASSEMBLY FOR CATEGORIZING AN ITEM (71) Applicant: Identinano AB, Gothenburg (SE)

(72) Inventors: Alexander Friemann Dmitriev, Gothenburg (SE); Rafael Cichelero, Angered (SE)

(73) Assignee: IDENTINANO AB, Gothenburg (SE)

( * ) Notice: Subject to any disclaimer, the term of this patent is extended or adjusted under 35 U.S.C. 154(b) by 0 days.

(21) Appl. No.: 18/285,424

(22) PCT Filed: Apr. 7, 2021

(86) PCT No.: PCT/EP2021/059010
§ 371 (c)(1),
(2) Date: Oct. 3, 2023

(87) PCT Pub. No.: WO2022/214166
PCT Pub. Date: Oct. 13, 2022

(65) Prior Publication Data
US 2024/0109104 A1    Apr. 4, 2024

(51) Int. Cl.
*B07C 5/34* (2006.01)
*B07C 5/342* (2006.01)

(52) U.S. Cl.
CPC .................. *B07C 5/3427* (2013.01)

(58) Field of Classification Search
CPC ........ G01N 21/17; G01N 21/31; G01N 21/55; B07C 5/3427
See application file for complete search history.

(56) References Cited

U.S. PATENT DOCUMENTS 9,970,949 B1 * 5/2018 Hall ...................... G01N 33/15
10,145,856 B2 * 12/2018 Hall ................... G01N 33/4833
(Continued)

FOREIGN PATENT DOCUMENTS

EP         1811302 A1    7/2007
KR      20100082820 A    7/2010
(Continued)

OTHER PUBLICATIONS

International Search Report and Written Opinion from International Application No. PCT/EP2021/059010, mailed on Oct. 22, 2020, 17 pages.
(Continued)

*Primary Examiner* — Joseph C Rodriguez
(74) *Attorney, Agent, or Firm* — Tucker Ellis LLP (57) ABSTRACT

A method for sorting of items (1) based on material type, comprising: —depositing an array of nanostructures (3) onto a surface portion of an item (1) to form a material identification tag (2), the nanostructures having an optical response dependent on the material type of the item onto which they are deposited, —illuminating the material identification tag using a light source (30), —determining at least one optical extinction and/or reflectance peak of the illuminated material identification tag, which peak is dependent on a material type of the item, —categorizing the item based on the detected optical extinction and/or reflectance spectrum, and —sorting the item in accordance with the categorization.

18 Claims, 3 Drawing Sheets

(56) References Cited

U.S. PATENT DOCUMENTS

| | | |
|---|---|---|
| 2010/0053598 A1 | 3/2010 | Kwon |
| 2010/0222917 A1 | 9/2010 | Bohlig |
| 2015/0290684 A1* | 10/2015 | Cadieux, Jr. ........... G01N 21/94 209/587 |
| 2020/0038915 A1* | 2/2020 | Harris ................ B07C 5/3412 |
| 2024/0054841 A1* | 2/2024 | Skrabalak ............ G07D 7/2033 |

FOREIGN PATENT DOCUMENTS

| | | |
|---|---|---|
| WO | 2020213761 A1 | 10/2020 |
| WO | 2021170235 A1 | 9/2021 |

OTHER PUBLICATIONS

Venkatapathi, Murugesan et al., "Radiative and non-radiative effects of a substrate on localized plasmon resonance of particles," Journal of Applied Physics 112, dated 2012, 5 pages.

Qin, Feng et al., "Role of shape in substrate-induced plasmonic shift and mode uncovering on gold nanocrystals," Nanoscale 8 17645, dated 2016, 13 pages.

Smith, Joshua D. et al., "Plasmonic Anticounterfeit Tags with High Encoding Capacity Rapidly Authenticated with Deep Machine Learning," ACS Nano 15 2901-2910, dated 2021, 10 pages.

Sadri-Moshkenani, Parinaz et al., "Plasmonic detection of possible defects in multilayer nanohole array consisting of essential materials in simplified STT-RAM cell," Plasmonics: Design, Materials, Fabrication, Characterization, and Applications XV, Proceedings of SPIE vol. 10346, dated 2017, 6 pages.

Kochergin, Vladimir et al., "Plasmonic enhancement of ultrafast all-optical magnetization reversal," Plasmonics: Metallic Nanostructures and Their Optical Properties IX, Proceedings of SPIE vol. 8098, dated 2011, 7 pages.

Ciuciulkaite, Agne et al., "Design of amorphous $Tb_xCo_{100-x}$ alloys for all-optical magnitization switching," Feb. 18, 2020, 9 pages.

Bi, Jiajie et al., "Asymmetric structural colors based on monodisperse single crystal $Cu_2O$ sphere," Nanoscale 12 3220, dated 2020, 8 pages.

* cited by examiner

METHOD FOR SORTING OF ITEMS AND AN ASSEMBLY FOR CATEGORIZING AN ITEM

TECHNICAL FIELD

The invention relates to a method for sorting of items based on material type, and an assembly for categorizing an item based on material type, such as based on a chemical composition and/or an atomic composition of the item or of a portion thereof. The invention further relates to the use of such an assembly in a material recycling process and in an automated industrial process.

The invention is applicable in all fields in which it is desirable to categorize and sort items based on material type, both in industrial processes and in small-scale categorization and sorting applications.

BACKGROUND

Localized surface plasmons, also referred to as nanoplasmons, are collective electron oscillations that couple to electromagnetic radiation and thereby localize and enhance the electromagnetic field on a nanoscale. Plasmonic nanostructures may be understood as nanoplasmonic optical antennas which are able to interact with UV-visible-near IR light similarly to how regular radio or mobile phone antennas operate, i.e., by capturing the propagating electromagnetic radiation and transforming it into local current at resonance frequencies. With such nanoplasmonic optical antennas, very high electromagnetic field concentrations become available that can be explored for sensing applications.

Nanoplasmonic sensing uses the fact that plasmonic resonances of nanoplasmonic optical antennas, such as metal particles, are very sensitive to the environment of the nanostructures. Specifically, changing the refractive index of the nanoscopic regions where the electromagnetic field is concentrated via localized surface plasmons can significantly shift the resonance of such antennas and thus change the wavelength at which the antenna scatters and absorbs light. This creates a far-field optical read-out possibility for detecting the local refractive index of for example a gas, liquid, or solid, surrounding the antennas.

Nanoplasmonic sensing is widely explored in applications, and several commercial solutions exist for detecting various gases and/or biological species, such as proteins, by means of such sensing. Various schemes exist for improving the sensitivity of nanoplasmonic optical antennas to changes of the surrounding refractive index. Such schemes have been previously described by for example A. Dmitriev (Ed.), *Nanoplasmonic Sensors*, Springer New York (2012).

Definitions

A nanostructure is herein to be interpreted as a component, particle, or structure with an equivalent spherical diameter of 1 nm-10 μm.

A nanoplasmonic optical antenna is to be understood as a plasmonic nanostructure, i.e. a nanostructure having a size and shape allowing for the exploitation of localized surface plasmon resonances. Depending on the shape and material of the nanostructure, the size at which such localized surface plasmon resonances arise varies, wherein larger sizes within the above defined range are generally applicable to doped semiconductor components, while as smaller sizes apply to metal nanostructures.

SUMMARY

An object of the invention is to provide a method for sorting of items based on material type, which method is in at least some aspect improved with respect to known methods. Another object is to provide an assembly for categorizing items based on material type, which assembly may be used to in at least some aspect facilitate categorization and sorting of items based on material type.

According to a first aspect of the invention, the object is achieved by a method for sorting of items based on material type, including:
- depositing an array of nanostructures onto a surface portion of an item to form a material identification tag, the nanostructures having an optical response dependent on the material type of the item onto which they are deposited,
- illuminating the material identification tag,
- detecting an optical extinction and/or reflectance spectrum of the illuminated material identification tag, which optical extinction and/or reflectance spectrum is dependent on a material type of the item,
- categorizing the item into one category of a plurality of predetermined categories based on the determined optical extinction and/or reflectance spectrum, and
- sorting the item in accordance with the categorization.

According to a second aspect of the invention, the object is achieved by an assembly for categorizing an item, including:
- deposition means for depositing an array of nanostructures onto a surface portion of an item to form a material identification tag, the nanostructures having an optical response dependent on the material type of the item onto which they are deposited,
- a light source for illuminating the material identification tag,
- a spectrometer for detecting an optical extinction and/or reflectance spectrum of the illuminated material identification tag, which optical extinction and/or reflectance spectrum is dependent on a material type of the item,
- means for categorizing the item into one category of a plurality of predetermined categories based on the detected optical extinction and/or reflectance spectrum.

According to a third aspect, the invention relates to the use of an assembly according to the second aspect for categorizing and sorting of items in a material recycling process.

According to a fourth aspect, the invention relates to the use of an assembly according to the second aspect for categorizing and sorting of items in an automated industrial process, such as a production process.

Within the scope of the present invention, it has been realized that nanostructures deposited on a surface of a solid item, which nanostructures have an optical response dependent on the material type of the item onto which they are deposited, may be used for categorizing and sorting of items according to material type of the item itself. This is possible since a refractive index of the material influences the optical extinction and/or reflectance peak of the array of nanostructures, forming the material identification tag. The position of the peak/s, i.e. the resonance frequency/wavelength of the array, will thus depend on the material type of the item. This enables quick and accurate categorization of items based on material type, and subsequent sorting. A material type may e.g. be a chemical and/or an atomic composition of the material.

On one hand, the proposed method and assembly may be used for categorizing and sorting, with high accuracy, components comprising different functional coatings, such as wafers or other substrates comprising such coatings. The coatings may e.g. be in the form of multi-component functional thin films, including for example magnetic tri-component systems, like GdFeCo, in which the atomic composition defines the ability of such systems to be switched in their magnetization state or remagnetized by ultra-short (femtosecond) light pulses, or steel carbide thin films in which the atomic composition (carbon content) defines stress in the thin film and its eventual hardness. The high sensitivity of the optical extinction and/or reflectance peak to slight differences in atomic composition enables setting up well-defined and narrow material categories according to which the components may be categorized and sorted.

On the other hand, the proposed method and assembly may also be used for automated categorization of items into considerably wider material categories in e.g. industrial processes or material recycling processes, and subsequent sorting of the items. The method and assembly may be used for a wide range of material types, such as paper, cardboard, plastics, ceramics, metals, glasses, etc.

The method and assembly are also useful in e.g. recycling of electronic components, that may comprise a plurality of different types of materials which are to be sorted according to material type and thereafter recycled.

Thus, sensors in the form of plasmonic nanostructures form the material identification tags that may carry information about several material parameters, from very basic like its nature, for example plastic, cardboard, paper, metal, glass, to highly specific properties such as whether the item is food packaging, the burning temperature of the item, whether additional functionality like cellulose-based or polymer electronics or other smart tags, including infrared (IR)-tags, for example, are attached, etc.

In essence, the material identification tags are single colour small dots on the surface of the item, delivering a unique identification due to the array of available parameters to encode and due to their extreme sensitivity to the properties of the material they are deposited onto. Identical material identification tags deposited on two items of different materials will result in different optical extinction and/or reflectance spectra, including peak positions and/or peak widths and/or peak heights (intensity) of the optical extinction and/or reflectance peaks. This strongly distinguishes them from any available identification technology, active or passive, such as IR-tags, QR-codes, and similar. The material identification tags may be read-out by simple white-light reflectance, wherein the read-out could be either fully automated or performed in person by a hand-held spectroscopic read-out, such as a smart-phone-based spectroscopic read-out.

The material identification tag may for the embodiments disclosed herein have a size within the range of 0.5 $mm^2$ to several $cm^2$, such as 0.5 $mm^2$ to 100 $cm^2$, depending on e.g. the method of applying the tag. Ideally, the size of the material identification tag is within a range of 1 $mm^2$ to 50 $mm^2$. It may for example be within the range of 1 $mm^2$ to 20 $mm^2$, or 1 $mm^2$ to 10 $mm^2$. Thus, the material identification tag may be visible as a coloured dot on the surface of the item. A smaller size of the tag generally results in less surface contaminants and may for this reason be advantageous.

The array of nanostructures may be an ordered array, in which the nanostructures are arranged in accordance with a periodic pattern, or it may be a disordered array lacking short- and/or long-range periodicity. The array may exhibit a short-range order but lack long-range order. In this case, the nanostructures may be arranged such that there is a characteristic spacing between neighbouring nanostructures although the nanostructures are not arranged in a periodic pattern.

Typically, categorizing the item comprises comparing at least peak positions and/or peak widths and/or peak heights of the detected optical extinction and/or reflectance spectrum to predetermined ranges or threshold values, which have been determined beforehand for a variety of material types, for example in laboratory-based measurements. Furthermore, machine learning algorithms may be used to refine the categorization, for example by an end user. Data treatment algorithms, rooted in machine learning, may be used to identify, with high accuracy, categories at various levels of complexity. Curve fitting may be used for determining peak positions, peak widths, and peak heights. A combination of peak positions, peak widths, and peak heights, or of two of those, may be used to define the different categories.

The method may be fully or partly automated, depending on the application.

Advantageous features are disclosed in the dependent claims. It is to be understood that features disclosed in connection with the first aspect are also relevant in connection with the second, third, and fourth aspects, respectively, and vice versa.

Optionally, depositing the array of nanostructures comprises using the same type of nanostructures for all items to be sorted, i.e. the nanostructures used for forming the material identification tag on all items to be sorted may be from the same source, such as from the same liquid container, or at least of the same type, such as of the same material, and having the same size and shape distributions. The nanostructures may preferably be identical, or largely identical within defined error margins. The optical extinction and/or reflectance spectrum, including one or several peaks, of the material identification tag will thus only depend on the type of material onto which it is deposited, and identical material identification tags deposited on two items of different materials will result in different spectra in terms of peaks positions, heights and widths. The categories may thus easily be set for the specific type of nanostructures used. Furthermore, the material identification tag may be deposited in close connection with the subsequent categorization since identical tags, within deposition tolerances, may be deposited onto all items.

Optionally, the nanostructures are metallic, dielectric, or semiconducting. The material of the nanostructures may be selected depending on application and desired properties. In particular, metal nanostructures are suitable in view of their plasmonic properties. Possible materials for metal nanostructures include for example copper (Cu), aluminium (Al), gold (Au), and silver (Ag), but also other metals and metal alloys may be used. In particular, noble metals such as Au and Ag are suitable for applications requiring a very high sensitivity of the material identification tag to the target material of the item. An inert metal as Au is also suitable for applications in which the tag may be exposed to a potentially reactive environment. Other metals such as Cu and Al may be more cost efficient to use for large scale applications. Moreover, the spectral range to be used for detection should be considered when selecting a suitable material. For example, Cu, Ag and Au nanostructures typically exhibit resonance peaks in the visible spectrum, while as Al nanostructures typically exhibit peaks in the UV spectrum.

Semiconductor and dielectric nanostructures, specifically those with high refractive indices and thus able to sustain so-called Mie electromagnetic resonances in the UV-vis-near-IR portions of the electromagnetic spectrum, are also applicable as sensors for materials properties. They are similarly able to concentrate the electromagnetic fields and thus their resonances depend on their direct dielectric environment. Thus, the array that constitute the material identification tag could be built based on semiconductor and/or dielectric nanostructures.

Optionally, illuminating the material identification tag comprises illuminating the material identification tag with light from a spectral range including ultraviolet light, and/or visible light, and/or near-infrared light. The light may preferably comprise white light. For example, light from a flashlight, a mobile phone flash, or another light source may be used. The illumination can be carried out by any non-monochromatic light source once the bare surface spectral response (baselining) has been collected, e.g. by detecting the spectral response in extinction and/or reflectance from a spot of the item surface without any material identification tag, such as next to the tag or before the tag is deposited.

Optionally, detecting the optical extinction and/or reflectance spectrum of the illuminated array of nanostructures comprises determining at least one of a peak position, a peak width, and a peak height of at least one optical extinction and/or reflectance peak of the spectrum. Optionally, detecting the optical extinction and/or reflectance spectrum of the illuminated array of nanostructures comprises determining at least two of a peak position, a peak width, and a peak height of at least one optical extinction and/or reflectance peak of the spectrum. Optionally, at least a peak position is determined. In a transmission mode, optical extinction may be measured, including scattering and absorption, while as otherwise reflectance may be measured. For most types of materials, it is most practical to use reflected light. The peak position of the at least one peak may be determined in terms of wavelength or frequency. The peak width may be determined as e.g. full width at half maximum (FWHM) of the peak. The peak position(s), width(s) and height(s) may typically be determined by curve fitting of the spectroscopic data, such as by fitting the spectroscopic data with Gaussian curves.

Optionally, depositing the array of nanostructures comprises applying a liquid containing the nanostructures onto the surface portion. The liquid may for example contain the nanostructures supported on microscopic flakes of a thin film, such as an amorphous carbon thin film, a graphene film, or another quasi or truly two-dimensional material thin film. The thin film should typically be dielectric, chemically inert, and may have a thickness of 10 nm or less, preferably 5 nm or less, or 2 nm or less. This ensures the structural stability of the nanostructures. The liquid may be a water based or an organic solvent based liquid. By using nanostructures contained in a liquid, the deposition may be achieved in a fast and efficient way with high reproducibility in connection with categorization of the item. In other words, it is possible for an end user to quickly deposit the array of nanostructures onto the item just prior to illumination and spectrum read-out. This enables the end user to quickly characterize and categorize items that have not been marked by e.g. a manufacturer of the item.

Optionally, the method further comprises producing the nanostructures on a flat substrate by a lithographic method, and subsequently lifting them into the liquid. Such lithographic methods include top-down techniques such as lithographic techniques, for example electron beam lithography, focused ion-beam lithography, (nano)imprint lithography and photolithography, and bottom-up techniques relying on self-assembly of nanostructures. This allows the production of well-defined nanostructures in a controlled way.

Optionally, the flat substrate comprises a thin film on which the nanostructures are supported, and wherein flakes of the thin film with the nanostructures supported thereon are subsequently transferred to the liquid. The nanostructures may in this case be produced on the surface of the thin film, on macroscopic or microscopic parts of which they are supported when contained in the liquid as mentioned above. The thin film is preferably of the type defined above.

Optionally, the method instead comprises synthesizing the nanostructures by a chemical synthesis method in the liquid. Thus, the nanostructures are chemically synthesized in a liquid solution. This is a fast and efficient way of producing large amounts of nearly identical nanostructures.

Optionally, depositing the array of nanostructures comprises spraying the liquid containing the nanostructures onto the surface portion. The material identification is thereby quickly provided and ready for illumination, thanks to the quick application and relatively short or non-existing drying time of the spray applied tag, depending on which liquid is used. For example, an organic solvent based liquid may result in instantaneous drying of the tag.

Optionally, depositing the array of nanostructures comprises drop casting of the liquid containing the nanostructures onto the surface portion. This is a simple and cheap way of applying the liquid.

Optionally, the nanostructures have a mean equivalent diameter of 10-500 nm, or 20-400 nm, or 30-200 nm, as measured in a plane parallel with a surface on which the nanostructures are provided. The mean equivalent diameter may for example be understood as a mean equivalent spherical diameter. The size may e.g. be determined using image analysis of scanning and/or transmission electron microscopy images, or by atomic force microscopy and/or profilometry images. Larger nanostructures can be identified by the high-resolution optical microscopy (confocal, high magnification, with digital zoom). Since an optical response of the nanostructures, in particular of metal nanostructures, is highly dependent on the size of the nanostructures, the optical response may also be used to determine the size of the nanostructures.

Optionally, the nanostructures are metal rings having an outer diameter of 100-300 nm, an inner diameter of 10-100 nm as measured in a plane parallel with a surface on which the metal rings are provided, and a height of 5-50 nm as measured in a direction perpendicular to said plane. The metal rings may be noble metal rings, comprising Au and/or Ag and/or Cu and/or Al and/or alloys thereof. Rings are particularly advantageous since they have two optical modes, of which a long-wavelength mode is more sensitive than that of a nanodisk at the same wavelength, such as about twice as sensitive. The metal rings may have a centre axis extending perpendicularly to the solid substrate on which the rings are provided. Alternatively, the nanostructures may for example be in the form of complex-shaped particles, such as three-dimensional crosses or stars with several equal of unequal protrusions, disks, cylinders, ellipses, and/or spheres.

Optionally, the plurality of categories are selected as material categories for material recycling, wherein sorting the item comprises sorting the item for recycling purposes. The plurality of material categories may e.g. comprise at least two categories selected from the group of metals, plastics, cardboard, glass, and paper. The set of categories may comprise one or more from the mentioned group. The set of categories may comprise several sub-categories within a main category, such as sub-categories for different types of metals, different types of cardboard, different types of plastics, etc.

Optionally, the deposition means is configured for deposition of nanostructures contained in a liquid. The deposition means may e.g. comprise a liquid container, a pump, and a nozzle for spray application or drop casting.

Optionally, the deposition means is configured for spraying of the liquid onto the item. The deposition means may comprise a nozzle for forming an aerosol containing the nanostructures in small droplets of the liquid.

Optionally, the assembly is configured for automated deposition, illumination, optical extinction and/or reflectance spectrum detection, and categorization. In other words, the assembly may be configured to perform the marking and categorizing of the item fully automatically. The assembly may further comprise means for automatic sorting of the categorized item.

An assembly may instead be provided which is configured for automated illumination, optical extinction and/or reflectance spectrum detection, and categorizing, of pre-deposited material identification tags.

Optionally, the assembly is contained in a hand-held device, such as in an integrated spray pistol with spectrometer. The hand-held device could be targeted for personal use as well as for materials identification at industrial sites, for example to identify environmentally harmful or hazardous materials prior to their use and/or recycling.

Further advantages and advantageous features of the invention are disclosed in the following description.

BRIEF DESCRIPTION OF THE DRAWINGS

With reference to the appended drawings, below follows a more detailed description of embodiments of the invention cited as examples.

In the drawings.

The drawings are schematic and not drawn to scale.

DETAILED DESCRIPTION OF EXAMPLE EMBODIMENTS OF THE INVENTION

Figure 1:
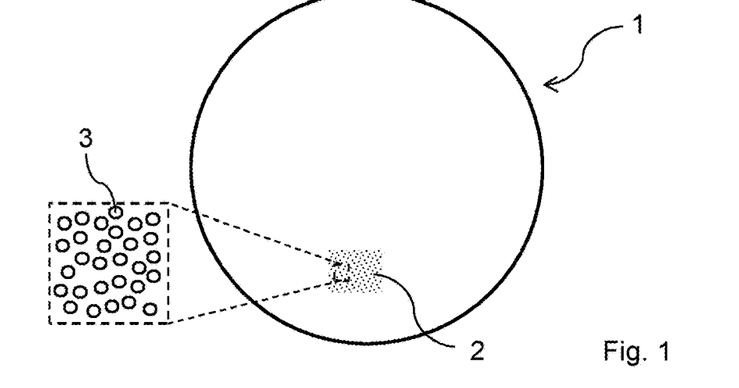
FIG. 1 is a top view of a substrate comprising an array of plasmonic nanostructures.
Figure 2:
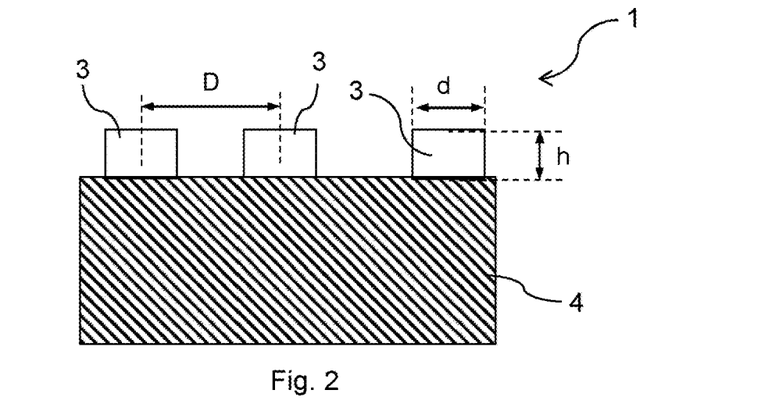
FIG. 2 is a side view of a portion of a substrate on which a plasmonic nanostructure is provided.

A solid item 1 on which a material identification tag 2, hereinafter also referred to as a tag 2, formed by an array of nanostructures 3 is provided is shown in FIGS. 1-2. The tag 2 comprising the tag of nanostructures 3 is provided on a surface portion of the solid item 1. The nanostructures 3 may be in the form of metal nanostructures, such as metal disks or metal cylinders having a height h and a diameter d. The portion of the solid item 1 on which the tag 2 is provided is herein a relatively small surface portion of the item 1. A centre-to-centre spacing D between neighbouring nanostructures 3 is shown to be irregular in FIGS. 1-2, but the nanostructures may alternatively be arranged according to an ordered pattern at regular distances from each other.

The nanostructures 3 have an optical response dependent on the material type of the item 1 onto which they are deposited. They may have a mean equivalent diameter d of 10-500 nm, or 20-400 nm, or 30-200 nm, as measured in a plane parallel with the surface on which the nanostructures are provided. The nanostructures 3 should ideally have a symmetric shape so that the spectrum becomes polarization independent, a flat shape to improve sensitivity, and a spectrum including more than one optical extinction and/or reflectance peak to encode information on at least 4-5 parameters of the spectrum. Rings, stars, and crosses are suitable nanostructure configurations.

Figure 3:
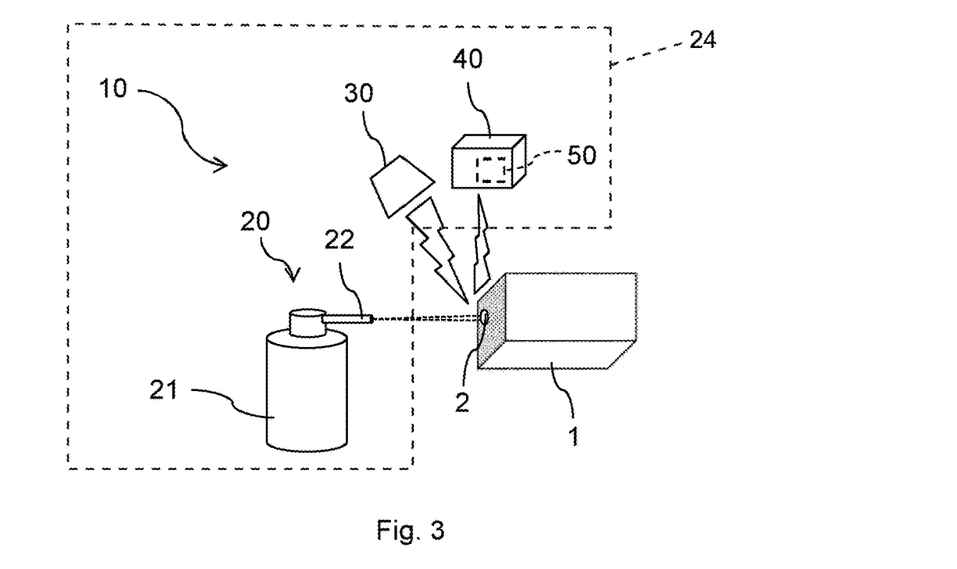
FIG. 3 is a schematic view of an assembly according to an embodiment of the invention.

An assembly 10 for categorizing an item 1 based on material type is schematically illustrated in FIG. 3. The assembly 10 comprises a deposition means 20 for depositing an array of nanostructures 3 onto a surface portion of the item 1 to form a material identification tag 2. The same deposition means 20 is used for depositing the tag 2 on all items 1 to be categorized, so as to form identical tags 2 on all items 1. The assembly 10 further comprises a light source 30 for illuminating the material identification tag 2, a spectrometer 40 for detecting an optical extinction and/or reflectance spectrum of the illuminated material identification tag 2, and a means 50 for categorizing the item 1 into one category of a plurality of predetermined categories based on the determined optical extinction and/or reflectance spectrum.

The deposition means 20 is in the shown embodiment exemplified by a liquid container 21 with a nozzle 22 for spray application of the liquid contained in the container 21, the liquid containing the nanostructures 3 so as to form a small material identification tag 2. The liquid may be sprayed in the form of an aerosol towards the surface of the item 1. The skilled person understands that the deposition means 20 may be embodied in many different ways, both for spray application and for drop casting of the liquid contained therein. Moreover, the deposition means 20 may be configured for manually or automatically depositing the tag 2, either by spraying or by drop casting. Thus, even though the deposition means 20 is in the shown embodiment in the form of a hand-held spray bottle, many other configurations are possible.

The light source 30 may be a flashlight, a mobile phone flash, a lamp, or another light source that provides light with a known spectral power distribution.

The spectrometer 40 is in the shown embodiment shown as integrated with the means 50 for categorizing the item 1, which may be in the form of a processing unit. The spectrometer may thus contain one or more processing unit(s) configured to on one hand determine peak position(s) and/or width(s), and/or height(s) of the optical extinction and/or reflectance peak(s), and on the other hand categorize the item 1 based on the detected peak(s). In other embodiments, the spectrometer 40 may be provided separately from the means 50 for categorizing the item 1. Communication means for communicating data between the spectrometer 40 and the means 50 for categorizing the item 1, either wireless or via a hardwired connection.

In some embodiments, the light source and the spectrometer may be integrated in the same device.

In some embodiments, the light source, the spectrometer, and the means for categorizing the item 1 may be combined in the same device, such as in a mobile phone with an add-on spectrometer and a mobile application for categorizing the item 1.

In some embodiments, the deposition means, the light source, the spectrometer, and the means for categorizing the item 1 may be combined in the same device. The device may be a hand-held device 24, or a device configured for automatic tag deposition and subsequent categorization in a production line, or at a recycling site, or similar.

The assembly may further comprise means for automatically sorting the categorized items 1, such as one or more robot(s). The means for categorizing and sorting may in that case be provided in the same device, or they may be comprised in different devices. For example, a first device may be provided for categorizing and marking the items 1 with a code readable by a second device, in turn comprising the sorting means.

Instructions for causing one or more processing units of the assembly to perform the desired actions may be provided in program products comprising a machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, a special-purpose computer, or special-purpose processing machines to perform a certain function or a group of functions.

Figure 4:
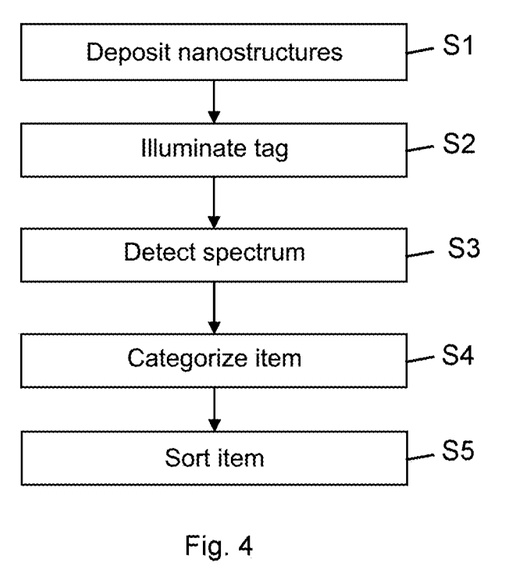
FIG. 4 is a flow chart illustrating a method according to an embodiment of the invention.

A method according to the invention is schematically illustrated in FIG. 4. The method comprises the following steps S1-S5:

S1: Depositing an array of nanostructures 3 onto a surface portion of an item 1 to form a material identification tag 2, the nanostructures 3 having an optical response dependent on the material type of the item 1 onto which they are deposited. The same type of nanostructures 3 are deposited onto all items 1 to be sorted, thus forming identical tags 2. The nanostructures 3 may e.g. be contained in a liquid, which is in turn applied onto the surface portion by spray deposition or by drop casting. The nanostructures 3 may be metallic, dielectric, or semiconducting nanostructures 3.

When the nanostructures are contained in a liquid, the nanostructures 3 may be produced on a flat substrate by a lithographic method or a self-assembly method, and subsequently lifted into the liquid. In this case, microscopic flakes of a supporting thin film, on which the nanostructures are supported, may be present in the liquid together with the nanostructures 3. The flakes may e.g. have a size of 10-5000 $\mu m^2$. The nanostructures 3 may alternatively be produced by chemical synthesis in a liquid solution.

The nanostructures 3 constituting the tag 2 may alternatively be produced on the item 1 by a lithographic or a self-assembly technique. In this case, the nanostructures are produced directly on the item 1, i.e. without prior lifting of the nanostructures 3 into a liquid. This way of producing the tag 2 is less suitable in applications in which an end user wants to sort unmarked items into different categories, since the application of the tag 2 is more complicated than using spray application or drop casting.

S2: Illuminating the material identification tag 2, using light from a light source with known spectral power distribution. The tag 2 may be illuminated with light from a spectral range including ultraviolet light, and/or visible light, and/or near-infrared light. The illumination may be in the form of continuous illumination or in the form of one or more light pulses of a short duration. The illumination may be in the form of a broad-band beam of light (white light) or a collection of narrow-band beams, down to single-wavelength beams, thus probing various regions of the extinction and/or reflectance spectrum, simultaneously or one-by-one.

S3: Detecting an optical extinction and/or reflectance spectrum of the illuminated material identification tag 2, which optical extinction and/or reflectance spectrum is dependent on a material type of the item 1. Since the tags 2 are identical, differences in the spectrum from tags 2 on different items 1 will stem from the material type of the item 1. The step S3 may be carried out by detecting a spectrum comprising at least light reflected off and/or light scattered off the illuminated tag 2, using a spectrometer, depending on whether the item 1 is transparent or opaque. In the case of an optical extinction spectrum, the spectrum includes optical absorption and scattering.

S4: Categorizing the item 1 into one category of a plurality of predetermined categories based on the detected optical extinction and/or reflectance spectrum. Machine learning algorithms may be used to continuously improve the categorization of the items 1. Peak positions of the optical extinction and/or reflectance spectrum, possibly in combination with peak widths and/or peak heights, may be used for the categorization by comparison with predetermined thresholds.

S5: Sorting the item 1 in accordance with the categorization. This step may involve automatic or manual sorting.

The method as described above may for example be used in a recycling application, in which items 1 to be sorted for recycling are categorized according to material type, for example as metal, plastic, cardboard, glass, or paper, for recycling of packaging material or household waste. A worker at a recycling site may apply the tag 2 onto the item to be sorted, or the tag 2 may be applied automatically onto the item. Thereafter, the tag 2 is illuminated, the spectrum is detected and the optical extinction and/or reflectance peak determined, and the item is categorized into the proper category as defined by wavelength or frequency thresholds. The item 1 is thereafter sorted for e.g. material recycling or energy recovery by burning at a suitable temperature. Different burning temperatures may be specified for different types of materials. It is furthermore possible to fine-tune the categories so as to provide separate categories for different types of metals, for different types of plastics, etc. This is particularly suitable for recycling of electronic components that may contain various valuable elements for recycling, which may be easily identified using the proposed method.

The method may also be used in automated industrial processes, such as an automated production process.

At least the steps S1-S4 may be performed using the assembly 10 described with reference to FIG. 3 above. If sorting means are provided in the assembly 10, also step S5 may be performed by the assembly 10.

The method step S1 may in some embodiments be carried out independently of the other steps. For example, the step S1 may be carried out during production of the items 1 while as the other steps S2-S5 are carried out during recycling, or during another industrial process involving the items 1 tagged in connection with production.

Example

Figure 5A:
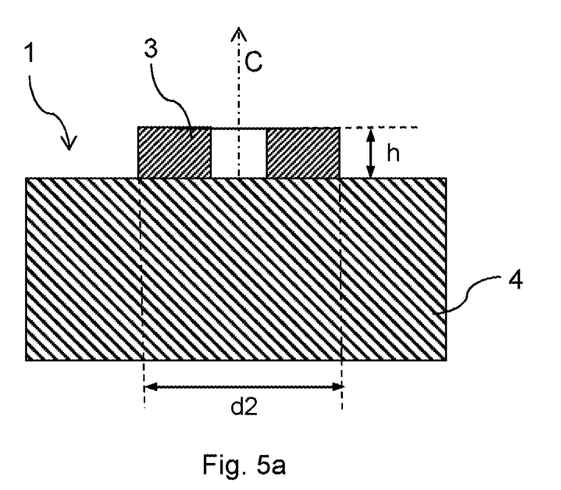
FIG. 5*a* is a schematic side view of a sample used in an exemplary embodiment of the method.
Figure 5B:
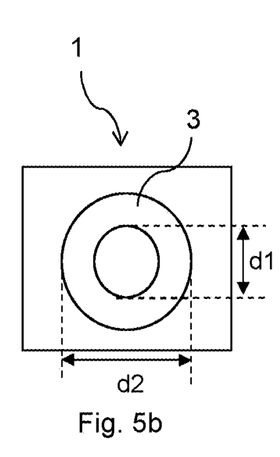
FIG. 5*b* is a schematic top view of the sample in FIG. 5*a*.

In an exemplary embodiment, the capability of the proposed method was investigated for sorting of samples 1 according to glass type of various glass samples as schematically shown in a sectional side view in FIG. 5a and in a top view in FIG. 5b. The glass samples were of commercial glass types T2X-1 annealed at 300K, T2X-2 annealed at 400K, float glass, crystal glass, and eagle glass, respectively. As nanostructures 3, arrays of plasmonic Ag nanorings 3 were provided on top of glass substrates 4, the nanorings 3 being arranged with a central axis C extending perpendicularly to a surface of the substrate 4. The nanorings 3 were fabricated using a hole-mask colloidal lithography technique in accordance with a method described in a previously published article by H. Fredriksson et al., Hole-mask lithography, *Adv. Mater.*, 19, 4297 (2007). The nanorings 3 were concentric, i.e. centrosymmetric, with a geometry determined by material deposition process parameters used during the fabrication. The nanorings 3 exhibited an outer diameter d2 of 110 nm and an inner diameter d1 of 35 nm.

The nanorings 3 formed an extended, up to several $cm^2$, short-range-ordered array of amorphously packed plasmonic nanostructures. The distribution of nanorings 3 is uniform. An average spacing between neighbouring nanorings 3 is approximately 2-3 outer ring diameters d2. In this example, an average height h of the nanorings 3 is approximately 10-nm.

Figure 6:
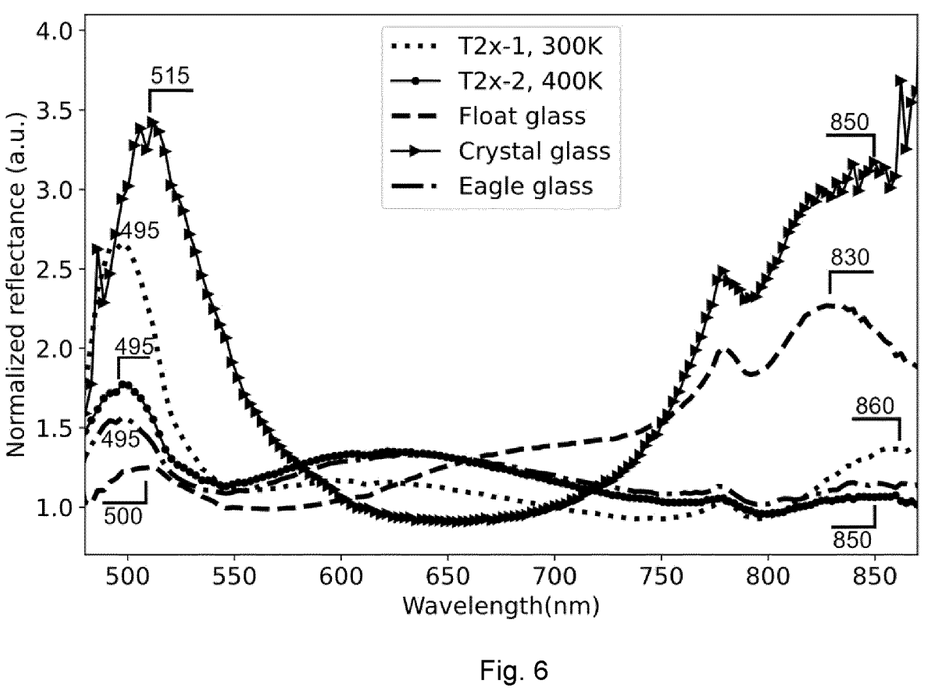
FIG. 6 shows optical extinction spectra obtained for various samples.

The optical reflectance spectra of the prepared samples 1 with Ag nanoring arrays were measured using a commercial spectrometer. The detected optical spectra from the samples are shown in FIG. 6, in which normalized reflectance is plotted as a function of wavelength. Each spectrum exhibits a first resonance peak in the wavelength range of 495-515 nm, and at least four of the samples further exhibit a peak in the near-infrared part of the spectrum, at 830-860 nm. The spectrum shape, including the peak positions as well as peak widths and peak heights, is highly dependent on glass type of the samples 1. The peaks and their characteristics, i.e. peak position, height and width, can be easily extracted by fitting the nanorings' spectroscopic data with Gaussians.

From the reflectance spectra obtained, it is clear that a lot of information can be encoded about the sample material, in particular if peak positions, peak widths and peak heights of the spectra are simultaneously taken into account.

The optical spectra of the samples 1 could be used to distinguish between the different glass types and categorize and sort the samples 1 accordingly. For example, samples having a first resonance peak at 495 nm and a second resonance peak at 860 nm could be categorized as T2X-1, 300K, while samples having a first resonance at 500 nm and a second resonance peak at 830 nm could be categorized as float glass. Furthermore, peak heights of the resonance peaks at 495 nm could be used to distinguish between the three glass types T2X-1, T2-X2, and eagle glass. Thus, by using a combination of peak positions, peak widths, and peak heights, it is possible to accurately categorize the samples according to glass type. Spectroscopic data from the material identification tag 2 deposited on various glass samples 1, as determined in laboratory experiments, could be used to define threshold values and/or ranges to be used for later small-scale or large-scale categorization and sorting in e.g. a material recycling process or in an automated industrial process, such as a production process. In such applications, the nanostructures may be deposited onto the items by other techniques than in the present example, such as by depositing the nanostructures contained in a liquid as described above.

Other experiments have shown that the material identification tag 2 comprising the nanoring array reacts markedly different when positioned on substrates comprising functional thin films such as ferrimagnetic TbCo thin films, where clear differences in mutual peak positions and spectroscopic widths are detected compared to when the tag 2 is deposited directly on a glass substrate.

It is to be understood that the present invention is not limited to the embodiments described above and illustrated in the drawings; rather, the skilled person will recognize that many changes and modifications may be made within the scope of the appended claims.

The invention claimed is:

1. A method for sorting a plurality of items of varying material types based on the material type of each item, comprising:
   for each item, depositing an array of nanostructures onto a surface portion of the item to form a material identification tag, the nanostructures being plasmonic so as to have an optical response dependent on the material type of the item onto which the nanostructures are deposited,
   for one of the items undergoing sorting, illuminating the material identification tag,
   for the item undergoing sorting, detecting an optical extinction and/or reflectance spectrum of the illuminated material identification tag, which optical extinction and/or reflectance spectrum is dependent on the influence that the material type of the item has on a refractive index of the optical extinction and/or reflectance peak of the array of nanostructures of the material identification tag, the detected optical extinction and/or reflectance spectrum being a signature of the material identification tag and item material combination,
   for the item undergoing sorting, categorizing the item into one category of a plurality of predetermined categories according to material type based on the detected optical extinction and/or reflectance spectrum, wherein categorizing the item comprises comparing at least peak positions and/or peak widths and/or peak heights of the detected optical extinction and/or reflectance spectrum to predetermined ranges or threshold values, which have been determined beforehand for the varying material types, and
   for the item undergoing sorting, sorting the item according to material type of the item in accordance with the categorization, and
   wherein the nanostructures in each deposited array of nanostructures comprises a single nanostructure type so that, for each material type and within deposition tolerances, the signature of the material identification tag is identical.

2. The method according to claim 1, wherein the nanostructures are metallic, dielectric, or semiconducting.

3. The method according to claim 1, wherein illuminating the material identification tag comprises illuminating the material identification tag with light from a spectral range including ultraviolet light, and/or visible light, and/or near-infrared light.

4. The method according to claim 1, wherein detecting the optical extinction and/or reflectance spectrum of the illuminated array of nanostructures comprises determining at least one of a peak position, a peak width, and a peak height of at least one optical extinction and/or reflectance peak of the spectrum.

5. The method according to claim 1, wherein depositing the array of nanostructures comprises applying a liquid containing the nanostructures onto the surface portion.

6. The method according to claim 5, further comprising: producing the nanostructures on a flat substrate by a lithographic method, and subsequently lifting them into the liquid.

7. The method according to claim 6, wherein the flat substrate comprises a thin film on which the nanostructures are supported, and wherein flakes of the thin film with the nanostructures supported thereon are subsequently transferred to the liquid.

8. The method according to claim 5, further comprising: synthesizing the nanostructures by a chemical synthesis method in the liquid.

9. The method according to claim 5, wherein depositing the array of nanostructures comprises spraying the liquid containing the nanostructures onto the surface portion.

10. The method according to claim 5, wherein depositing the array of nanostructures comprises drop casting of the liquid containing the nanostructures onto the surface portion.

11. The method according to claim 1, wherein the nanostructures have a mean equivalent diameter of 10-500 nm, or 20-400 nm, or 30-200 nm, as measured in a plane parallel with a surface on which the nanostructures are provided.

12. The method according to claim 1, wherein the nanostructures are metal rings having an outer diameter of 100-300 nm, an inner diameter of 10-100 nm as measured in a plane parallel with a surface on which the metal rings are provided, and a height of 5-50 nm as measured in a direction perpendicular to said plane.

13. The method according to claim 1, wherein the plurality of categories are selected as material categories for material recycling, and wherein sorting the item comprises sorting the item for recycling purposes.

14. The method according to claim 13, wherein the plurality of material categories comprise at least two categories selected from the group of metals, plastics, cardboard, glass, and paper.

15. An assembly for categorizing items of varying material types based on the material type of each item, comprising:
a liquid containing nanostructures,
deposition means for depositing an array of the nanostructures contained in the liquid onto a surface portion of each item to form a material identification tag respectively on each item, wherein:
the nanostructures are plasmonic and have an optical response dependent on the material type of the item onto which the nanostructures are deposited,
an optical extinction and/or reflectance spectrum of the material identification tag is dependent on an influence that the material type of the item has on a refractive index of the optical extinction and/or reflectance peak of the array of nanostructures of the material identification tag, the optical extinction and/or reflectance spectrum being a signature of the material identification tag and item material combination, and
the nanostructures in each deposited array of nanostructures comprises a single nanostructure type so that, for each material type and within deposition tolerances, the signature of the material identification tag is identical,
a light source for illuminating the material identification tag of one of the items underdoing characterization,
a spectrometer for detecting the optical extinction and/or reflectance spectrum of the illuminated material identification tag of the item undergoing characterization,
means for categorizing the item undergoing characterization into one of plural predetermined categories category according to material type based on the detected optical extinction and/or reflectance spectrum, wherein categorizing the item comprises comparing at least peak positions and/or peak widths and/or peak heights of the detected optical extinction and/or reflectance spectrum to predetermined ranges or threshold values, which have been determined beforehand for the varying material types.

16. The assembly according to claim 15, wherein the deposition means is configured for spraying of the liquid onto the item.

17. The assembly according to claim 15, wherein the assembly is configured for automated deposition, illumination, spectrum detection, and categorization.

18. The assembly according to claim 15, wherein the assembly is configured as a hand-held device.

* * * * *